(12) United States Patent
van Herrewegen et al.

(10) Patent No.: US 8,788,828 B2
(45) Date of Patent: *Jul. 22, 2014

(54) NON-TRANSFERABLE ANONYMOUS DIGITAL RECEIPTS

(75) Inventors: Elsie van Herrewegen, Horgen (CH); Jan Camenisch, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,263

(22) Filed: Sep. 12, 2012

(65) Prior Publication Data

US 2013/0007461 A1 Jan. 3, 2013

Related U.S. Application Data

(60) Continuation of application No. 12/544,763, filed on Aug. 20, 2009, now Pat. No. 8,327,147, which is a division of application No. 10/475,682, filed as application No. PCT/IB02/00907 on Mar. 25, 2002, now abandoned.

(30) Foreign Application Priority Data

Apr. 23, 2001 (EP) ..................................... 01810395

(51) Int. Cl.
*H04L 9/32* (2006.01)

(52) U.S. Cl.
CPC ........... *H04L 9/3247* (2013.01); *H04L 2209/56* (2013.01); *H04L 2209/42* (2013.01)
USPC ........... 713/175; 713/150; 713/151; 713/168; 713/156; 713/176; 713/177; 713/179; 713/180; 713/181; 713/171; 380/277; 380/278; 380/279; 726/2; 726/3; 726/4; 726/5; 726/6; 705/24; 705/64; 705/69; 705/75; 705/50

(58) Field of Classification Search
None
See application file for complete search history.

(56) References Cited

U.S. PATENT DOCUMENTS

| | | | | |
|---|---|---|---|---|
| 5,124,117 | A * | 6/1992 | Tatebayashi et al. | 380/281 |
| 5,521,980 | A | 5/1996 | Brands | |
| 5,604,805 | A | 2/1997 | Brands | |
| 6,587,945 | B1 * | 7/2003 | Pasieka | 713/176 |
| 2002/0007457 | A1 | 1/2002 | Neff | |
| 2002/0059144 | A1 | 5/2002 | Meffert et al. | |
| 2002/0150241 | A1 * | 10/2002 | Scheidt et al. | 380/44 |
| 2005/0066171 | A1 * | 3/2005 | Simon | 713/175 |

FOREIGN PATENT DOCUMENTS

| | | | |
|---|---|---|---|
| CN | WO9725801 | | 7/1997 |
| WO | WO 97/25801 | * | 7/1997 |

OTHER PUBLICATIONS

Anna Lysyanskaya, Ronald L. Rivert, Amit Sahai, and Stefan Wolf, "Pseudonym Systems", SAC'99, Aug. 1999, LNCS 1758/2000, pp. 184-199.*
Jan Camenisch and Ivan Damgard, "Verifiable Encryption, and Their Applications to Separable Group Signatures and Signature Sharing Schemes", Springer Berlin/Heidelberg, (2000) pp. 331-345.*
David Chaum, "Untraceable Electronic Mail, Return Addresses, and Digital Pseudonyms", Communication of the ACM, Feb. 1981, vol. 24, No. 2, pp. 1-8.*
Marc Rennhard et al., "From SET to PSET—The Pseudonymous Secure Electronic Transaction Protocol", Technical Report, TIK-Nr. 117, Aug. 2001, pp. 1-28.*
Camenisch, J., et al., "Verifiable Encryption, Group Encryption, and their Applications to Seperable Group Signatures and Signature Sharing Shemes", Springer Berlin/Heidelberg, (2000) pp. 331-345.
Lysyanskaya, A., et al., "Pseudonym Systems", SAC '99, Aug. 1999, LNCS 1758/2000, pp. 184-199.

* cited by examiner

*Primary Examiner* — Luu Pham
*Assistant Examiner* — Canh Le
(74) *Attorney, Agent, or Firm* — Scully, Scott, Murphy & Presser, P.C.; William Stock, Esq.

(57) ABSTRACT

A system and method for verifying ownership of an electronic receipt in a communication system providing a public key infrastructure, the verification arising out of a series of messages being sent and received between a first party and a verifying party, the method comprising the steps of receiving a proof message from the first party, the proof message being derived from at least a first public key based on a secret owned by the first party and wherein the secret is associated with at least the secret of a further public key of the first party and an electronic receipt that has been issued by electronically signing a request message with a second public key, determining whether or not the proof message was derived from the second public key.

12 Claims, 3 Drawing Sheets

Fig. 3.3

NON-TRANSFERABLE ANONYMOUS DIGITAL RECEIPTS

CROSS REFERENCE AND PRIORITY

This application is a continuing application of commonly-owned, co-pending U.S. patent application Ser. No. 12/544,763 filed on Aug. 20, 2009, which is a divisional of U.S. application Ser. No. 10/475,682, filed Apr. 22, 2004, which is an application filed in the National Stage entry of PCT/IB02/00907 filed Mar. 25, 2002, which was filed under 35 USC 371, is cross-referenced with, and claims priority from, International Patent Application PCT/IB02/00907 filed on 25 Mar. 2002, and published in English with Publication No. WO02/087148 on 31 Oct. 2002 under PCT article 21(2), which in turn claims priority of 01810395.2 filed on 23 Apr. 2001.

TECHNICAL FIELD

The present invention relates to the field of computing, it specifically concerns a method and a technical implementation for secure data exchange over a computer network. More particularly, the present invention relates to a method for securely proving ownership of anonymous electronic receipts and credentials while the owner is discouraged to give away his receipts or credentials.

BACKGROUND

Since the mid 1990s one of the most rapidly growing retail sectors is referred to as electronic commerce. Electronic commerce involves the use of the Internet and proprietary networks to facilitate business-to-business, consumer, and auction sales of everything imaginable, from computers and electronics to books, recordings, automobiles, and real estate. In such an environment consumer privacy is becoming a major concern.

However, the mere fact that electronic commerce is conducted over an existing open network infrastructure such as the Internet runs counter to the privacy of the consumer. Often, there are legitimate reasons for a party to remain anonymous towards peers and outsiders.

As the collection and exploitation of private information become more of a concern, users are less willing to give out information, and may want to conduct transactions under a pseudonym or anonymously. A user in such a pseudonymous or anonymous transaction may want a receipt of the transaction (e.g., receipt of a payment), which can be used at a later point in time. For example, the user may receive a receipt for a payment giving him access to certain information on the World Wide Web and the Internet, and may want to use that receipt at (a) later point(s) in time to get the information or to prove that a particular transaction took place, e.g., that the user made a payment. In a pseudonymous or anonymous system, where the user is making the transaction anonymously or under a pseudonym P, a 'classical' digital receipt (e.g., a digital signature) would prove the pseudonym's P involvement in the transaction. However, such a receipt may be intercepted and used by anyone claiming to be the pseudonym P. Also, the user acting under pseudonym P may give the receipt away to his friends, enabling those friends to access the same information.

There is a call for a method where a user in a pseudonymous or anonymous system is able to prove to be the legitimate owner of a transaction receipt, without revealing his/her real identity. In the course of this the user should be prevented from giving away his receipts to other parties, e.g., to his/her friends.

SUMMARY

In accordance with the present invention, there is provided a method for generating an electronic receipt in a communication system providing a public key infrastructure, the method comprising the steps of receiving by a second party a request message from a first party, the request message comprising a transaction request and a first public key based on a secret owned by the first party and wherein the secret is associated with at least the secret of a further public key of the first party, electronically signing at least part of the request message with the public key assigned to the second party to issue the electronic receipt, and providing the electronic receipt to the first party. In general, the signing with the second public key can be understood as a signing with the secret associated with the second public key.

Further, there is provided a method for verifying the ownership of an electronic receipt in a communication system providing a public key infrastructure, the verification arising out of a series of messages being sent and received between a first party and a verifying party, the method comprising the steps of receiving a proof message from the first party, the proof message being derived from at least a first public key based on a secret owned by the first party and wherein the secret is associated with at least the secret of a further public key of the first party and an electronic receipt that has been issued by electronically signing at least part of a request message with a second public key, determining or examining whether or not the proof message was derived from the second public key.

In general, the signing with the public key can be understood as a signing with the secret associated with said public key. The secret is usually called secret key.

By applying the above methods a high level of security can be achieved. These assure that the secret key of the first public key is linked to the secret key(s) of the first party, also referred to as user. The linkage is such that the knowledge of one secret key will allow to learn at least some of the other secret keys. If some of these secret keys are valuable to the user, the linking discourages the user to give away his/her electronic receipt, e.g., to a friend. For instance, the secret key of the user could be bound or linked to a secret that gives access to a bank account. Also possible is that all secrets within the system are linked together. Then, for example, one friend has the possibility to completely impersonate the user. This is like to use someone's purse with all content, e.g., identity, credit cards, driving license, house keys etc.

Further advantages of the above methods are: in a pseudonymous or anonymous transaction-based system, it is possible to remain anonymous/pseudonymous when showing electronic receipts, while securely proving ownership of the respective receipt. In addition, the receipts are non-transferable, i.e., the receipts are constructed in such a way that if the user wants to give away the receipt, he/she has to give away the secret which underlies all his/her pseudonymous transactions, and thus allows to impersonate him/her.

Another advantage is that the methods for generating a receipt and for verifying the ownership of the receipt can be implemented in existing communication networks providing a public key infrastructure, such as the Internet.

The methods are particularly useful in the case the receipt actually represents a license (e.g., a software license). By applying the methods it is almost impossible for the legitimate owner of the license, i.e., the user who received the license, to give away the license. From this point of view, the copyright and its application can be supported by the present invention.

The methods in accordance with the present invention can be used in a communication system providing a public key infrastructure. That is a system of public key encryption and signature schemes using digital certificates from certificate authorities and other registration authorities that verify and authenticate the validity of each party involved in an electronic transaction. The certificate authority, also called "Trusted Third Party", is an entity, typically a company, that issues digital certificates to other entities like organizations or individuals to allow them to prove their identity to others and to securely communicate. The certificate authority might be an external company that offers digital certificate services or it might be an internal organization such as a corporate MIS (Management Information System) department. The Certificate Authority's chief function is to verify the identity of entities and issue digital certificates attesting to that identity.

In comparison, in a public key encryption scheme, each person gets a pair of keys, called the public key and the private key. Each person's public key is published while the private key is kept secret. Messages are encrypted using the intended recipient's public key and can only be decrypted using his private key. This mechanism can also be used for or in conjunction with a digital signature.

The digital signature is formed by extra data appended to a message which identifies and authenticates the sender and message data using public-key encryption. The sender uses a one-way hash function to generate a hash-code of, for example, 160 bits from the message data. He then signs the hash-code with his private key. The receiver computes the hash-code from the data as well and verifies the received hash with the sender's public key.

The need for sender and receiver to share secret information, e.g., keys, via some secure channel is eliminated, since all communications involve only public keys, and no private key is ever transmitted or shared. Public-key schemes can be used for authentication, confidentiality, integrity and non-repudiation. RSA is an example of a public-key cryptography system.

The one-way hash function, also called "message digest function", used for the digital signature is a function which takes a variable-length message and produces a fixed-length hash. Given the hash it is computationally impossible to find a message with that hash. In fact, one cannot determine any usable information about a message with that hash, not even a single bit. For some one-way hash functions it is also computationally impossible to determine two messages which produce the same hash. A one-way hash function can be private or public, just like an encryption function. A public one-way hash function can be used to speed up a public-key digital signature system. Rather than signing a long message which can take a long time, the one-way hash of the message is computed, and the hash is digitally signed.

The methods in accordance with the present invention can be applied within a pseudonym system such as, for example, described by A. Lysanskaya et al. In H. Heys and C. Adams. Editors, Selected Areas in Cryptography, vol. 1758 of LNCS, Springer Verlag, 1999. For example, a party or server issuing the receipt is an organization, e.g., a certification authority, in the pseudonym system, and the user is one user in the pseudonym system. Issuing the receipt is achieved by issuing a 'receipt' credential to the user. The properties of the pseudonym system assure that the following advantages can be realized. Showing the receipt is realized by anonymous proof of ownership of the 'receipt' credential. Showing the receipt can even be made unlinkable to the original transaction, if no data are encoded in the receipt which make different showings linkable. The receipts distinguish oneself with non-transferability. If the user wants to transfer the receipt (e.g., to a friend), the user has to give away his/her secret key underlying all of his/her pseudonyms in the pseudonym system, and thus the friend has the power to impersonate him/her.

In the dependent claims various modifications and improvements of the methods are contained.

DESCRIPTION OF THE DRAWINGS

Preferred embodiments of the invention are described in detail below, by way of example only, with reference to the following schematic drawings.

FIG. 2.1 shows message exchanges between the user and the second party comprising a fourth cryptographic proof.

FIG. 2.2 shows further message exchanges between the user and the second party comprising a fifth cryptographic proof.

FIG. 3.1 shows message exchanges between the user and a verifying party comprising a second cryptographic proof.

FIG. 3.2 shows further message exchanges between the user and the verifying party comprising a first cryptographic proof.

FIG. 3.3 shows further message exchanges between the user and the verifying party comprising a third cryptographic proof concerning the receipt and the encryption.

The drawings are provided for illustrative purpose only and do not necessarily represent practical examples of the present invention to scale.

DETAILED DESCRIPTION

Figure 1:
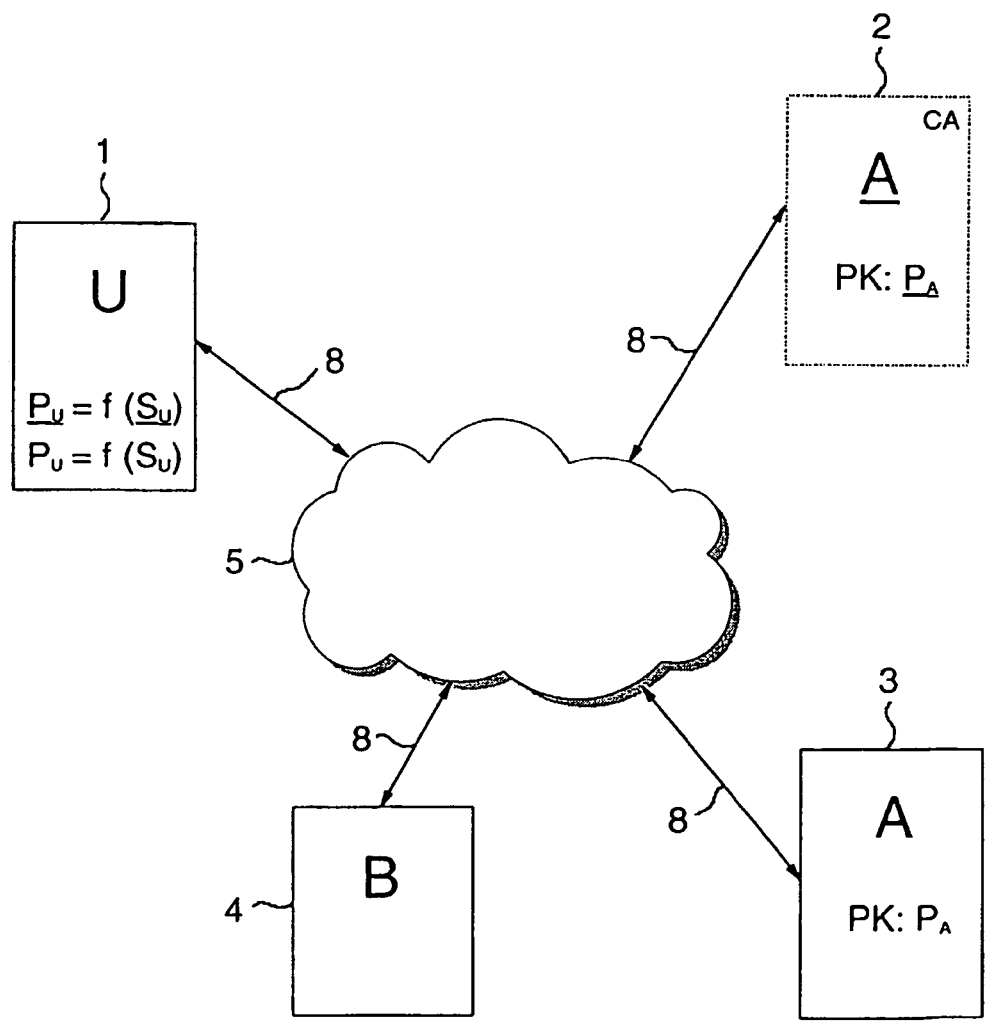
FIG. 1 shows a schematic illustration of possible involved parties connected via a network.

With reference to FIG. 1, the general layout of a communication environment is described in which the invention can be used. In the figures, same reference numerals or letters are used to denote the same or like parts. A first party, also referred to as requester or user U, indicated in box 1, is able to communicate with a second party $\underline{A}$, indicated in the dotted box 2, a second party A, also referred to as first verifying party A that is indicated in box 3, and a second verifying party B, indicated in box 4, over a network 5 via communication connections 8 as known in the art. In the scenario, the second party $\underline{A}$ is a certificate authority while the second party A indicates a software company distributing their products and giving licenses for it. The second party $\underline{A}$ can be called issuer and is hereafter called certificate party $\underline{A}$. The second verifying party B can be called verifier and is implemented as a validation server for checking, for example, such a license. The second party A, indicated in box 3, can have either the function of a verifier or the function of an issuer. It is understood that the second party A and the second verifying party B can belong to the same business entity or can even be implemented on the same computer system.

As indicated in box 1, the user U has a first public key $P_U$ and a further public key $\underline{P}_U$. The first public key $P_U$ bases on a secret $S_U$ that is associated with or linked to the secret $\underline{S_U}$ or $S_{UE}$ of the further public key $\underline{P_U}$ or $P_{UE}$ (not shown). This further public key $\underline{P_U}$ or $P_{UE}$, also referred to as external public key $P_{UE}$, can be one public key used in connection with a bank, for example. As indicated in box 2, the certificate party $\underline{A}$ has a second public key $\underline{P_A}$. The second party A, as indicated in box 3, has a second public key $P_A$.

The general layout of the communication environment is shown to facilitate the description of the following figures. Within the following FIGS. 2 to 4, the exchange of messages and in particular their relevant content is indicated above or below the respective arrows.

Figure 2:
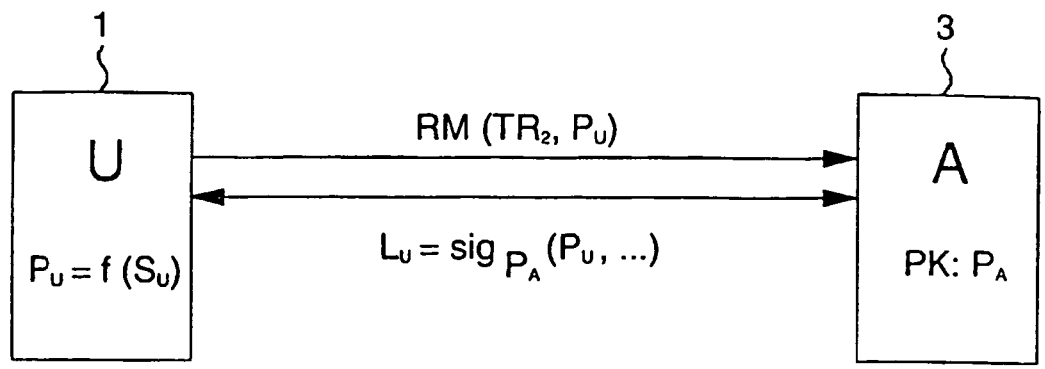
FIG. 2 shows a schematic illustration of a generation of an electronic receipt with a user and a second party.

Turning now to FIG. 2, in which a schematic illustration shows a generation of an electronic receipt $L_U$, hereafter short receipt $L_U$, issued by the second party A. It is understood that the word receipt or electronic receipt comprises a credential, a certificate, or a license.

The second party A, as indicated with box 3, receives the request message RM, labeled as RM ($TR_2$, $P_U$) from the user U. The request message RM comprises a second transaction request $TR_2$ and the first public key $P_U$. The first public key $P_U$ bases on the secret $S_U$ owned by the first party U. The secret $S_U$ is associated, for instance, by an encryption to the secret $\underline{S_U}$ or $S_{UE}$ of a further public key (not shown in FIG. 2) of the first party U. The second party A electronically signs the request message RM with the second public key $P_A$. The receipt $L_U$ is issued and sent to the first party U, labeled as $L_U = \text{sig}_{P_A}(P_U, \ldots)$. In other words, after the second party A concludes the transaction, the receipt $L_U$ is issued and returned to the user U.

Later when the user U wants to prove to be the legitimate owner of the receipt $L_U$, he sends a proof message PM to the second party A, which acts then as the first validation party A, or to the second validation party B, as described with reference to FIG. 3 below. For example, this can be advantageously applied for an update of a product, e.g., a software, or at each or several starts of it for validation or copyright purposes.

Before the validation of the receipt $L_U$ is described, further message exchanges are explained. FIG. 2.1 shows message exchanges between the user U and the second party A comprising an encryption $E_1$ and a fourth cryptographic proof for verifying the encryption. This encryption comprises the secret $S_{UE}$ used in connection with an external party, e.g., a bank. The second party A receives the further public key $P_{UE}$ and a first encryption $E_1$ of the secret $S_{UE}$ of the further public key $P_{UE}$ under the first public key $P_U$, labeled with $P_{UE}$; $E_1 = \text{enc}_{P_u}(S_{UE})$. The second party A publishes the first encryption $E_1$. By doing so, the link between the secret $S_U$ of the first public key $P_U$ and the secret $S_{UE}$ of the further public key $P_{UE}$ can be guaranteed. Giving away the secret $S_U$ would cause that also the secret $S_{UE}$ is given away. By verifying the fourth cryptographic proof, it can be found out whether or not the secret $S_{UE}$ of the further public key $P_{UE}$ is encrypted in the first encryption $E_1$ under the first public key $P_U$. Thus, the above received further public key $P_{UE}$ and the first encryption $E_1$ can be verified. This is expressed with $$\text{PROVE}_{4th}(S_{UE}:-E_1 = \text{enc}_{P_u}(S_{UE})$$

$$-P_{UE} = f(S_{UE})).$$

The expression $P_{UE} = f(S_{UE})$ symbolizes that the public key $P_{UE}$ is derived as a function f of the secret key $S_{UE}$. The function f is a general one and can be chosen ad libitum.

In general, cryptographic proofs are known in the art and are described, for example, by Jan Camenisch and Ivan Damgård in their article "Verifiable encryption, group encryption, and their applications to separable group signatures and signature sharing schemes" T. Okamoto, editor. Advances in Cryptology—ASIACRYPT '2000, number 1976 in Lecture Notes in Computer Science, Kyoto, Japan, 2000. International Association for Cryptologic Research, Springer-Verlag, Berlin Germany, pages 331-345.

FIG. 2.2 shows further message exchanges between the user U and the second party A comprising a fifth cryptographic proof for verifying the internal encryption and a receipt $\underline{L_U}$. It is assumed that the receipt $\underline{L_U}$ has been issued from the certificate party $\underline{A}$ and the user $\underline{U}$ has obtained the receipt $\underline{L_U}$, as described with reference to FIG. 4. With internal encryption is meant the encryption in view of the secret $S_U$ used in connection with the certificate party $\underline{A}$. The second party A receives a second encryption $E_2$ of the secret $\underline{S_U}$ of the further public key $\underline{P_U}$ under the first public key $P_U$ from the user U. This is labeled with $E_2 = \text{enc}_{P_u}(\underline{S_U})$. The second party A publishes the second encryption $E_2$. By doing so, the link between the first public key $P_U$ and the secret $\underline{S_U}$ can be guaranteed. By verifying a fifth cryptographic proof of the existence of a first, second, and third value $\underline{P_U}$, $\underline{S_U}$, $\underline{L_{Uu}}$, such that the first value $\underline{P_U}$ is a public key derived from the second value $\underline{S_U}$ and the third value $\underline{L_U}$ is a signature with respect to the second public key $\underline{P_A}$ on at least the first value $\underline{P_U}$ and the second encryption $E_2$ is the encryption of the second value $\underline{S_U}$ under the first public key $P_U$, the received second encryption $E_2$ and the receipt $\underline{L_U}$ can be verified. This is expressed with $$\text{PROVE}_{5th}(\underline{P_U}, \underline{S_U}, \underline{L_U}:-\underline{P_u} = f(S_U)$$

$$-E_2 = \text{enc}_{P_u}(\underline{S_U})$$

$$-\underline{L_U} = \text{sig}_{P_A}(\underline{P_U}, \ldots)).$$

Figure 3:
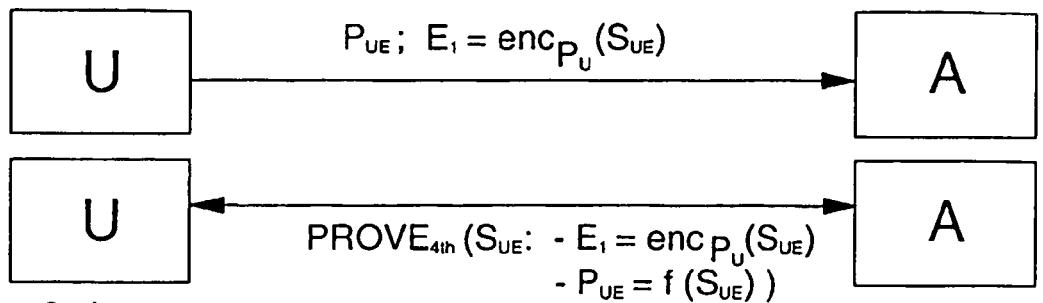
FIG. 3 shows a schematic illustration of a verification of the ownership of an electronic receipt according to the present invention.
Figure 3:
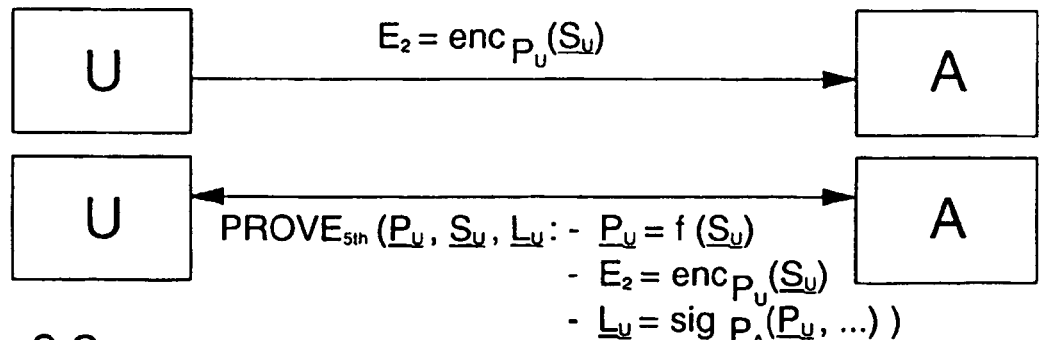
Figure 3:
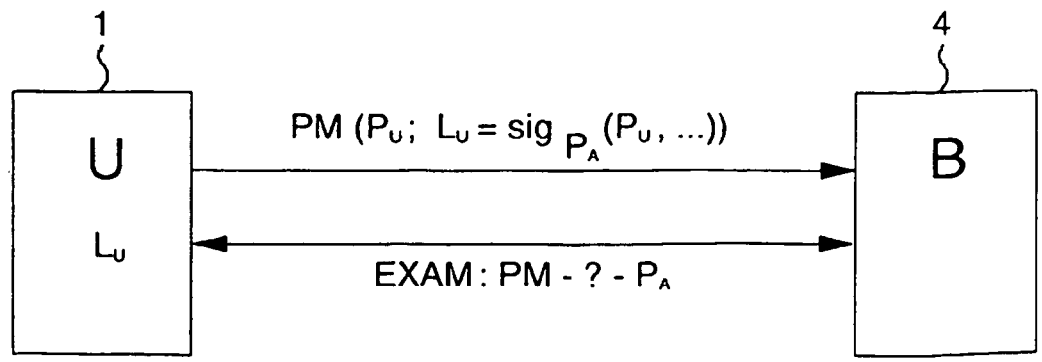

FIG. 3 shows a schematic illustration of a verification of the ownership of an electronic receipt. In detail, the ownership of the receipt $L_U$, that has been issued by the second party A, is verified. The second validation party B, indicated with box 4, receives a proof message PM from the user U, indicated with box 1. The proof message PM is derived from the first public key $P_U$ that bases on the secret $S_U$ owned by the user U. As described above, the secret $S_U$ is associated, for example, by the encryption to the secret $\underline{S_U}$ or $S_{UE}$ of the further public key $\underline{P_U}$ or $P_{UE}$ of the user U. The proof message PM is further derived from the receipt $L_U$ that has been issued by electronically signing the request message RM with the second public key $P_A$. The content of the proof message PM is examined whether or not it was derived with respect to the second public key $P_A$.

FIG. 3.1 shows message exchanges between the user U and the second verifying party B comprising a second cryptographic proof for verifying the receipt $L_U$. By verifying the second cryptographic proof of the existence of a first, second, and third value $P_U$, $S_U$, $L_U$, such that the first value $P_U$ is a public key derived from the second value $S_U$ and the third value $L_U$ is a signature with respect to the second public key $P_A$ on at least the first value $P_U$, the received first public key $P_U$ and the receipt $L_U$ can be verified. This is expressed with $$\text{PROVE}_{2nd}(P_U, S_U, L_U:-P_U = f(S_U)$$

$$-L_U = \text{sig}_{P_A}(P_U, \ldots)).$$

FIG. 3.2 shows further message exchanges between the user U and the second verifying party B comprising a first cryptographic proof for verifying the external encryption. The second verifying party B receives the further public key $P_{UE}$ and the first encryption $E_1$ of the secret $S_{UE}$ of the further public key $P_{UE}$ under the first public key $P_U$. The second verifying party B publishes the first encryption $E_1$. By doing so, the link between the secret of the first public key $P_U$ and the secret $S_{UE}$ of the further public key $P_{UE}$ can be guaranteed. By verifying the first cryptographic proof that the secret $S_{UE}$ of the further public key $P_{UE}$ is encrypted in the first encryption $E_1$ under the first public key $P_U$, the above received further public key $P_{UE}$ and the first encryption $E_1$ can be verified. This is expressed with $$PROVE_{1st}(S_{UE}:-E_1=enc_{Pu}(S_{UE})$$

$$-P_U=f(S_U)$$

$$-L_U=sig_{PA}(P_U,\dots)).$$

FIG. 3.3 shows further message exchanges between the user U and the second verifying party B comprising a third cryptographic proof for verifying the receipts $L_U$ and $\underline{L}_U$ and the internal encryption. The second verifying party B receives the second encryption $E_2$ of the secret $\underline{S}_U$ of the further public key $\underline{P}_U$ under the first public key $P_U$ from the user U. This is indicated with $E_2=enc_{Pu}(\underline{S}_U)$. The second verifying party B publishes the second encryption $E_2$. By doing so, the link between the secret $S_U$ of the first public key $P_U$ and the secret $\underline{S}_U$ can be guaranteed. By verifying the third cryptographic proof of the existence of values $P_U, S_U, L_U, \underline{P}_U, \underline{S}_U, \underline{L}_U$ such that the first value $P_U$ is a first public key derived from the second value $S_U$ and the third value $L_U$ is a signature with respect to the second public key $P_A$ on at least the first value $(P_U)$, and the fourth value $\underline{P}_U$ is the public key derived from the fifth value $\underline{S}_U$ and the sixth value $\underline{L}_U$ is a signature with respect to the third public key $\underline{P}_A$ on at least the fourth value $\underline{P}_U$ and the second encryption $E_2$ is the encryption of the second value $S_U$ under the fourth value $\underline{P}_U$, the received second encryption $E_2$ and the receipts $L_U$ and $\underline{L}_U$ can be verified. This is expressed with $$PROVE_{3nd}(P_U,S_U,L_U,\underline{P}_U,\underline{S}_U,\underline{L}_U:$$

$$-P_U=f(S_U)-\underline{P}_U=f(\underline{S}_U)$$

$$-L_U=sig_{PA}(P_U,\dots)-E_2=enc_{Pu}(\underline{S}_U)$$

$$-\underline{L}_U=sig_{PA}(\underline{P}_U,\dots)).$$

Figure 4:
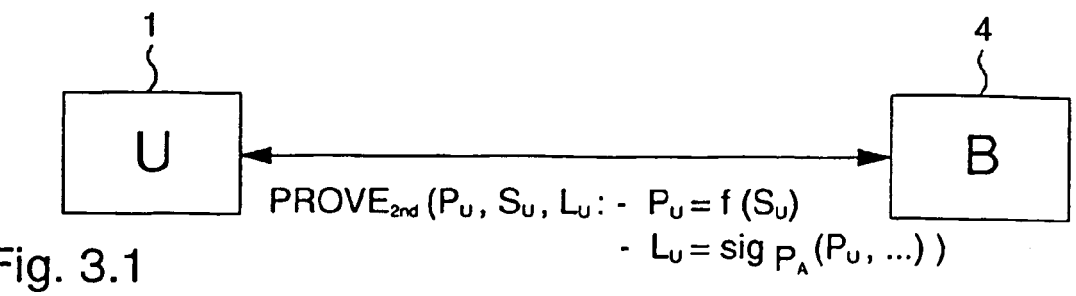
FIG. 4 shows a schematic illustration of the generation of an electronic receipt with a certificate authority.
Figure 4:
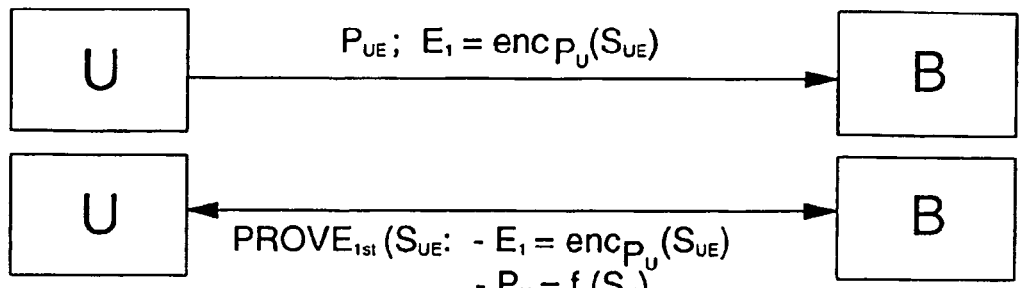
Figure 4:
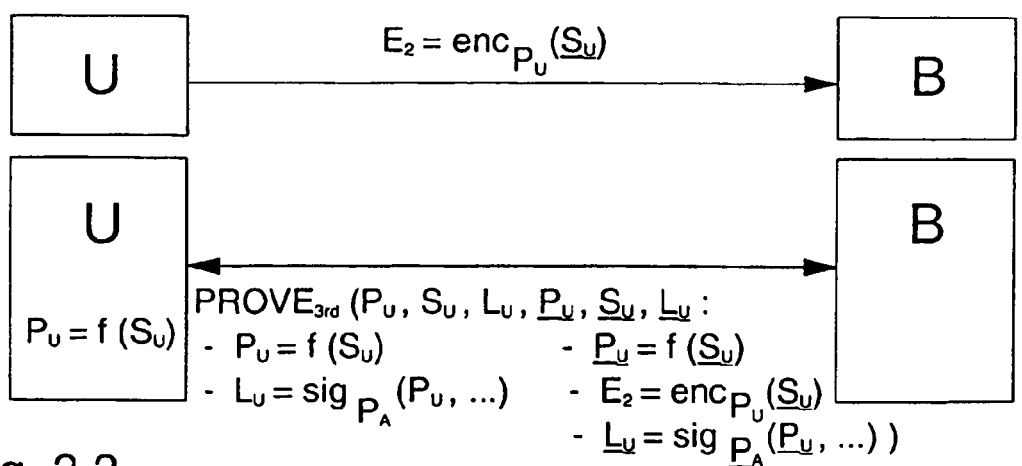
Figure 4:
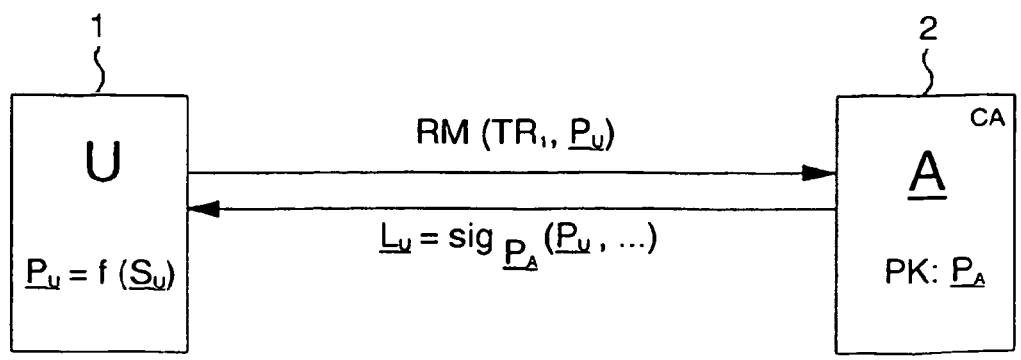

Turning now to FIG. 4, in which a schematic illustration shows the generation of the receipt $L_U$, issued by the certificate party A. This receipt generation should be performed before the generation of the receipt $L_U$ by the second party A and can be seen as a pre-installment. The certificate party A, as indicated with box 2, receives a request message RM, labeled as RM ($TR_1, P_U$) from the user U. The request message RM comprises a first transaction request $TR_1$ and the first public key $P_U$. The first public key $P_U$ bases on the secret $S_U$ owned by the first party U. The secret $S_U$ is associated with another secret of a further public key of the first party U. The second party A electronically signs the request message RM with the second public key $P_A$ that is assigned to the second party A. The latter step can be omitted. The receipt $L_U$ is issued and sent to the first party U, labeled as $L_U=sig_{PA}(P_U,\dots)$.

In general, the transaction requests $TR_1$ and $TR_2$ can be any kind of business commonly referred to as electronic commerce. Whereby, electronic commerce summarizes conducting of business communication and transactions over networks and through computers. As most restrictively defined, electronic commerce is the buying and selling of goods and services, and the transfer of funds, through digital communications. However electronic commerce also includes all inter-company and intra-company functions, such as marketing, finance, manufacturing, selling, and negotiation, that enable commerce and use electronic mail, file transfer, fax, video conferencing, workflow, or interaction with a remote computer. Electronic commerce also includes buying and selling over the World Wide Web and the Internet, electronic funds transfer, smart cards, digital cash, and all other ways of doing business over digital networks.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for verifying ownership of an electronic receipt by a validating party (B) in a communication system providing a public key infrastructure, the verification arising out of a series of messages being sent and received between a first party (U), a second party (A), and a certificate authority (A), said method comprising:

receiving, at the certificate authority (A) a request message (RM) from the first party (U), the request message (RM) comprising a transaction request (TR) and a public key ($P_U$) based on a secret ($S_U$) owned by the first party (U), and wherein the secret ($S_U$) is associated with at least a further secret ($S_U$) of a further public key ($P_U$) of the first party (U), electronically signing, by said certificate authority (A), at least part of the request message (RM) with a public key ($P_A$) assigned to said the certificate authority (A) for issuance as said electronic receipt ($L_U$) to said first party (U);

said method further comprising:

subsequently receiving, at said second party (A), an encryption ($E_2$) of the secret ($S_U$) of a user's public key ($P_U$) under the further public key ($P_U$);

publishing, by said second party (A), said encryption ($E_2$) to establish a link between the further secret ($S_U$) of the further public key ($P_U$) and the secret ($S_U$) of the public key ($P_U$), wherein:

$$E_2=enc_{Pu}(S_U);\ and$$

receiving at said validation party (B) a proof message (PM) from said first party (U), said PM derived from said further public key ($P_U$) based on the further secret ($S_U$) owned by the user U, said further secret ($S_U$) being associated via said encryption ($E_2$) to said further public key ($P_U$), said proof message (PM) being further derived from an electronic receipt ($L_U$) previously issued by second party (A) signing said RM with a public key $P_A$ of said second party;

said second validating party (B) receiving said encryption ($E_2$) and publishing said encryption $E_2$; and validating by the validating party (B) user ownership of said electronic receipt ($L_U$) and ($L_U$) and said encryption ($E_2$) by verifying a cryptographic proof of the existence of values $P_U$, $S_U$, $L_U$, $P_U$, $S_U$, $L_U$ such that the value $P_U$ is a first public key derived from the value $S_U$ and the value $L_U$ is a signature with respect to the public key $P_A$ on at least the value ($P_U$), and the value $P_U$ is the public key derived from the value $S_U$ and the value $L_U$ is a signature with respect to the public key $P_A$ on at least the value $P_U$ and the encryption $E_2$ is the encryption of the value $S_U$ under the value $P_U$.

2. The method according to claim 1, further comprising:
receiving, at said second party (A), a further public key ($P_{UE}$) and a first encryption ($E_1$) of a secret ($S_{UE}$) of the further public key ($P_{UE}$) under the public key ($P_a$), wherein $E_1 = enc_{Pu}(S_{UE})$.

3. The method according to claim 2, further comprising: verifying a first cryptographic proof whether or not the secret ($S_{UE}$) of the further public key ($P_{UE}$) is encrypted in the first encryption ($E_1$) under the first public key ($P_U$).

4. The method according to claim 1, further comprising: verifying a further cryptographic proof of the existence of a first, second, and a third value ($P_U$, $S_U$, $L_U$) such that a first value ($P_U$) is a public key derived from the second value ($S_U$) and a third value ($L_U$) is a signature with respect to a second public key ($P_A$) on at least the first value ($P_U$).

5. A system for verifying ownership of an electronic receipt by a validating party (B) in a communication system providing a public key infrastructure, the verification arising out of a series of messages being sent and received between a first party (U), a second party (A), and a certificate authority (A), the system comprising:
  a memory storage device;
  a processor device in communication with said memory storage device at a first computer system configured to perform a method to:
  receive, at the certificate authority (A) a request message (RM) from the first party (U), the request message (RM) comprising a transaction request (TR) and a public key ($P_U$) based on a secret ($S_U$) owned by the first party (U), and wherein the secret ($S_U$) is associated with at least a further secret ($S_U$) of a further public key ($P_U$) of the first party (U),
  electronically sign, by said certificate authority (A), at least part of the request message (RM) with a public key ($P_A$) assigned to said the certificate authority (A) for issuance as said electronic receipt ($L_U$) to said first party (U);
  said method further comprising:
  subsequently receive, at said second party (A), an encryption ($E_2$) of the secret ($S_U$) of a user's public key ($P_U$) under the further public key ($P_U$);
  publish, by said second party (A), said encryption ($E_2$) to establish a link between the further secret ($S_U$) of the further public key ($P_U$) and the secret ($S_U$) of the public key ($P_U$), wherein:

$$E_2 = enc_{pu}(S); \text{ and}$$

receive at said validation party (B) a proof message (PM) from said first party (U), said PM derived from said further public key ($P_U$) based on the further secret ($S_U$) owned by the user U, said further secret ($S_U$) being associated via said encryption ($E_2$) to said further public key ($P_U$), said proof message (PM) being further derived from an electronic receipt ($L_U$) previously issued by second party (A) signing said RM with a public key $P_A$ of said second party;
  said second validating party (B) receiving said encryption ($E_2$) and publishing said encryption $E_2$; and
  a processor device in communication with a memory storage device at a second computer system configured to perform a method to:
  validate by the validating party (B) user ownership of said electronic receipt ($L_U$) and ($L_U$) and said encryption ($E_2$) by verifying a cryptographic proof of the existence of values $P_U$, $S_U$, $L_U$, $P_U$, $S_U$, $L_U$ such that the value $P_U$ is a first public key derived from the value $S_U$ and the value $L_U$ is a signature with respect to the public key $P_A$ on at least the value ($P_U$), and the value $P_U$ is the public key derived from the value $S_U$ and the value $L_U$ is a signature with respect to the public key $E_A$ on at least the value $P_U$ and the encryption $E_2$ is the encryption of the value $S_U$ under the value $P_U$.

6. The system according to claim 5, wherein said second party (A) further receives a further public key ($P_{UE}$) and a first encryption ($E_1$) of a secret ($S_{UE}$) of the further public key ($P_{UE}$) under the public key ($P_U$), wherein $E_1 = enc_{Pu}(S_{UE})$.

7. The system according to claim 6, wherein said processor device is configured to further verify a first cryptographic proof whether or not the secret ($S_{UE}$) of the further public key ($P_{UE}$) is encrypted in the first encryption ($E_1$) under the first public key ($P_U$).

8. The system according to claim 5, wherein said processor device is configured to further verify a further cryptographic proof of the existence of a first, second, and a third value ($P_U$, $S_U$, $L_U$) such that a first value ($P_U$) is a public key derived from the second value ($S_U$) and a third value ($L_U$) is a signature with respect to a second public key ($P_A$) on at least the first value ($P_U$).

9. An article of manufacture comprising:
  a computer usable medium, said medium not a propagating signal, said medium having computer readable program code tangibly embodied therein to execute at least one machine instruction in a processing unit for verifying ownership of an electronic receipt by a validating party (B) in a communication system providing a public key infrastructure, the verification arising out of a series of messages being sent and received between a first party (U), a second party (A), and a certificate authority (A) wherein:
  a certificate authority (A) receives a request message (RM) from the first party (U), the request message (RM) comprising a transaction request (TR) and a public key ($P_U$) based on a secret ($S_U$) owned by the first party (U), and wherein the secret ($S_U$) is associated with at least a further secret ($S_U$) of a further public key ($P_U$) of the first party (U),
  the certificate authority (A) electronically signs at least part of the request message (RM) with a public key ($P_A$) assigned to said the certificate authority (A) for issuance as said electronic receipt ($L_U$) to said first party (U); and wherein
  a second party (A) subsequently receives an encryption ($E_2$) of the secret ($S_U$) of a user's public key ($P_U$) under the further public key ($P_U$), the second party (A) publishing said encryption ($E_2$) to establish a link between the further secret ($S_U$) of the further public key ($P_U$) and the secret ($S_U$) of the public key ($P_U$), wherein:

$$E_2 = enc_{pu}(S_U); \text{ and}$$

wherein at the processing unit, when running, said computer readable program code causing the processing unit to perform a method to:

receive at said validation party (B) a proof message (PM) from said first party (U), said PM derived from said further public key ($P_U$) based on the further secret ($S_U$) owned by the user U, said further secret ($S_U$) being associated via said encryption ($E_2$) to said further public key ($P_U$), said proof message (PM) being further derived from an electronic receipt ($L_U$) previously issued by second party (A) signing said RM with a public key $P_A$ of said second party;

said second validating party (B) receiving said encryption ($E_2$) and publishing said encryption $E_2$; and validate by the validating party (B) user ownership of said electronic receipt ($L_U$) and ($L_U$) and said encryption ($E_2$) by verifying a cryptographic proof of the existence of values $P_U, S_U, L_U, P_U, S_U, L_U$ such that the value $P_U$ is a first public key derived from the value $S_U$ and the value $L_U$ is a signature with respect to the public key $P_A$ on at least the value ($P_U$), and the value $P_U$ is the public key derived from the value $S_U$ and the value $L_U$ is a signature with respect to the public key $P_A$ on at least the value $P_U$ and the encryption $E_2$ is the encryption of the value $S_U$ under the value $P_U$.

10. The article of manufacture according to claim 9, wherein said second party (A) further receives a further public key ($P_{UE}$) and a first encryption ($E_1$) of a secret ($S_{UE}$) of the further public key ($P_{UE}$) under the public key ($P_U$), wherein $E_1 = \text{enc}_{P_u}(S_{UE})$.

11. The article of manufacture according to claim 10, wherein the verifying includes verifying a first cryptographic proof whether or not the secret ($S_{UE}$) of the further public key ($P_{UE}$) is encrypted in the first encryption ($E_1$) under the first public key ($P_U$).

12. The article of manufacture according to claim 9, wherein the verifying includes verifying a further cryptographic proof of the existence of a first, second, and a third value ($P_U, S_U, L_U$) such that a first value ($P_U$) is a public key derived from the second value ($S_U$) and a third value ($L_U$) is a signature with respect to a second public key ($P_A$) on at least the first value ($P_U$).

\* \* \* \* \*